(12) United States Patent
Ihara et al.

(10) Patent No.: US 9,403,968 B2
(45) Date of Patent: Aug. 2, 2016

(54) HEAVY RELEASE ADDITIVE FOR RELEASE SHEET, POLYORGANOSILOXANE COMPOSITION FOR RELEASE SHEET, AND RELEASE SHEET

(71) Applicant: SHIN-ETSU CHEMICAL CO., LTD., Tokyo (JP)

(72) Inventors: Toshiaki Ihara, Annaka (JP); Shunji Aoki, Annaka (JP); Shinji Irifune, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/403,324

(22) PCT Filed: May 17, 2013

(86) PCT No.: PCT/JP2013/063752
§ 371 (c)(1),
(2) Date: Nov. 24, 2014

(87) PCT Pub. No.: WO2013/176044
PCT Pub. Date: Nov. 28, 2013

(65) Prior Publication Data
US 2015/0133594 A1 May 14, 2015

(30) Foreign Application Priority Data
May 25, 2012 (JP) .................................. 2012-119418

(51) Int. Cl.
| | | |
|---|---|---|
| C08K 5/5419 | (2006.01) | |
| C09D 183/06 | (2006.01) | |
| C08G 77/44 | (2006.01) | |
| C08L 83/04 | (2006.01) | |
| C09D 183/04 | (2006.01) | |
| C09D 183/10 | (2006.01) | |
| C08G 77/14 | (2006.01) | |
| C08G 77/16 | (2006.01) | |

(52) U.S. Cl.
CPC .............. *C08K 5/5419* (2013.01); *C08G 77/44* (2013.01); *C08L 83/04* (2013.01); *C09D 183/04* (2013.01); *C09D 183/06* (2013.01); *C09D 183/10* (2013.01); *C08G 77/14* (2013.01); *C08G 77/16* (2013.01)

(58) Field of Classification Search
None
See application file for complete search history.

(56) References Cited

U.S. PATENT DOCUMENTS

| | | |
|---|---|---|
| 3,527,659 A | 9/1970 | Keil |
| 2005/0020764 A1 | 1/2005 | Dhaler et al. |
| 2007/0087207 A1 | 4/2007 | Irifune |
| 2007/0275255 A1 | 11/2007 | Ooms et al. |
| 2011/0160376 A1 | 6/2011 | Hori et al. |
| 2012/0328863 A1* | 12/2012 | Kuo ............................. 428/220 |

FOREIGN PATENT DOCUMENTS

| | | | |
|---|---|---|---|
| EP | 0 216 376 A1 | 4/1987 | |
| JP | 49-27033 B | 7/1974 | |
| JP | 57-29676 A | 2/1982 | |
| JP | 59-84953 A | 5/1984 | |
| JP | 0 400 614 A2 | 12/1990 | |
| JP | 5-53183 B2 | 8/1993 | |
| JP | 6-86582 B2 | 11/1994 | |
| JP | 2750896 B2 | 2/1998 | |
| JP | 10-110156 A | 4/1998 | |
| JP | 2742835 B2 | 4/1998 | |
| JP | 10-245540 A | 9/1998 | |
| JP | 11-61094 A | 3/1999 | |
| JP | 2000-86893 A | 3/2000 | |
| JP | 2005-509046 A | 4/2005 | |
| JP | 2007-106908 A | 4/2007 | |
| JP | 2007-523225 A | 8/2007 | |
| JP | 2010-37557 A | 2/2010 | |
| WO | WO 2005/063890 | * | 7/2005 |
| WO | WO 2011/087146 | * | 7/2011 |

OTHER PUBLICATIONS

International Search Report dated Aug. 20, 2013 issued in corresponding application PCT/JP2013/063752.
Japanese Office Action dated Jan. 6, 2015, issued in corresponding JP Patent Application No. 2012-119418 (3 pages).
European Search Report dated Oct. 22, 2015 issued in counterpart European patent application No. 13794464.1 (4 pages).

* cited by examiner

*Primary Examiner* — Marc Zimmer
(74) *Attorney, Agent, or Firm* — Westerman, Hattori, Daniels & Adrian, LLP

(57) ABSTRACT

A heavy release additive for a release sheet comprises a condensation reaction product of dehydrative condensation reaction between (A) a polydiorganosiloxane of average polymerization degree of 500 to 10,000 and has at least one hydroxy or hydrolysable group per molecule and (B) a polyorganosiloxane resin composed of a $(SiO_{4/2})$ unit and a $(R_3SiO_{1/2})$ unit (wherein R's independently represent a $C_{1-12}$ monovalent hydrocarbon group or a $C_{2-6}$ alkenyl group each having no aliphatic unsaturated bond), has a ratio of the $(R_3SiO_{1/2})$ unit to the $(SiO_{4/2})$ unit of 0.6 to 1.2 by mole, and contains the hydroxy group and the hydrolysable group in the total content of 2.1 mass % or more and less than 10.0 mass %. The heavy release additive can have the effect of achieving an extremely great peel force compared with cases in which no additive is added.

12 Claims, No Drawings

HEAVY RELEASE ADDITIVE FOR RELEASE SHEET, POLYORGANOSILOXANE COMPOSITION FOR RELEASE SHEET, AND RELEASE SHEET

TECHNICAL FIELD

This invention relates to a release sheet-forming addition reaction type high-release additive capable of exerting an improved tight release effect, a release sheet-forming polyorganosiloxane composition comprising the same, and a release sheet such as release paper or release film.

BACKGROUND ART

One prior art approach for preventing adhesion and anchorage of pressure-sensitive adhesive materials to substrates of paper or plastics is to form a cured coating of polyorganosiloxane composition on the substrate surface to impart release properties. The methods of forming a cured polyorganosiloxane coating on the substrate surface include a method of forming a release coating via addition reaction, which is widely employed because of satisfactory cure and an ability to match with a variety of release requirements covering from low-rate peel to high-rate peel.

The method of forming a release coating via addition reaction encompasses a solvent type wherein a polyorganosiloxane composition is dissolved in organic solvent, an emulsion type wherein a polyorganosiloxane composition is dispersed in water using an emulsifier, and a solventless type composed solely of a polyorganosiloxane composition. Since the solvent type has the drawback that it is sometimes harmful to the human body or environment, the safety aspect pushes a changeover from the solvent type to the solventless type in progress.

In general, the polyorganosiloxane compositions for release paper are desired to have varying release forces depending on their purpose. In the application where tight release is necessary, a composition having added thereto an alkenyl-containing MQ resin is widely used. Herein M units designate $R'_3SiO_{1/2}$ units, Q units designate $SiO_{4/2}$ units, and R' is a monovalent hydrocarbon group (the same applies hereinafter).

However, the tight release effect of the alkenyl-containing MQ resin is not so high, and sometimes, the release force does not reach the desired level even when the resin is added in large amounts. Since the alkenyl-containing MQ resin is expensive, the addition of large amounts is unfavorable in cost. There is a need for a composition which can achieve a tight release effect when added in minute amounts. It is also known that the alkenyl-containing MQ resin has the tendency that the release force decreases with the lapse of time as compared with that developed immediately after cure. There is a need for an additive ensuring that the release force remains unchanged with the lapse of time.

JP-B H05-53183 (Patent Document 1) discloses a release paper-forming polyorganosiloxane composition comprising an alkenyl-containing MQ resin in admixture with alkenyl-free MQ resin. The change with time of release force is reduced, but the tight release effect is insufficient.

JP 2750896 (Patent Document 2) discloses a release paper-forming solvent type polyorganosiloxane composition of addition reaction type comprising an alkenyl-containing resin. Low-temperature cure and release force with a little change with time are achieved, but the release force is not so high because tightening of release is not intended.

JP 2742835 (Patent Document 3) discloses an addition reaction type polyorganosiloxane composition having added thereto an equilibration reaction product of a vinyl-containing polyorganosiloxane and a polyorganosiloxane of the formula: $(R''_3SiO_{1/2})_a(R''_2SiO)_b(R''SiO_{3/2})_c(SiO_{4/2})_d$ wherein a, b, c and d indicative of molar fractions of respective siloxane units are a=0.1 to 0.6, b=0 to 0.45, c=0 to 0.3, and d=0.3 to 2.0 and R'' is a monovalent hydrocarbon group. The reaction product is deemed to be an MQ resin having vinyl-terminated siloxane bonded thereto.

However, Patent Document 3 refers nowhere to the optimum range of structure. In Example, 40 parts by weight of polydimethylsiloxane having a degree of polymerization of ~8,000 and containing vinyl at both ends and 60 parts by weight of a 30 wt % toluene solution of polyorganosiloxane consisting of $(R''_3SiO_{1/2})_a$ units (M units) and $(SiO_{4/2})_d$ units (Q units) in a molar ratio of 0.8/1 are heat treated at 100° C. for 5 hours in the presence of potassium hydroxide as catalyst, and the product is used to formulate a high-release additive composition. Because of its extremely high degree of polymerization, the product must be diluted with an organic solvent before it can be used. The tight release effect is about 2 to 3.8 times when 10 parts by weight of the high-release additive is blended, and is still insufficient.

As the method of gaining tight release by adding a polyorganosiloxane resin having adhesiveness to an addition reaction type polyorganosiloxane composition, the following technique is reported.

JP-B H06-086582 (Patent Document 4) relates to an adhesive polyorganosiloxane protective coating agent comprising a curable silicone rubber and a product obtained from partial dehydration condensation of a both end hydroxyl-containing polyorganosiloxane and a MQ unit-containing silicone resin. This needs a solvent because the silicone rubber and silicone resin are high-viscosity fluids or solids. Patent Document 4 relates to the pressure-sensitive adhesive application and refers nowhere to the tight release effect of release control agent for release paper. Also no descriptions are found other than the blending ratio of the silicone rubber and MQ unit-containing silicone resin.

JP-A H10-110156 (Patent Document 5) relates to a polyorganosiloxane-based pressure-sensitive adhesive based on a mixture or partial condensate of vinyl raw rubber and MQ resin. This needs a solvent because the silicone rubber is used. Patent Document 5 refers nowhere to the tight release effect of release control agent for release paper.

JP-A 2010-37557 (Patent Document 6) discloses a release modifier comprising a polyorganosiloxane resin-polyorganosiloxane condensation product that is obtained by the condensation reaction of (a1) 100 parts by weight of MQ-type resin in which the molar ratio of M units to Q units is 0.6 to 1.0 and the content of hydroxyl or alkoxy group is 0.3 to 2.0% by weight with (a2) 20 to 150 parts by weight of chain-form polydiorganosiloxane containing a hydroxyl or alkoxy group and having an average degree of polymerization of 100 to 1,000. Patent Document 6 describes that the release force measured at a low peel rate of 0.3 m/min in Example is increased only by a factor of 1.4 to 2.2 over Comparative Example free of condensation product. No sufficient tight release effect is obtained. This is presumably because component (a1) has a hydroxyl or alkoxy content which is as low as 0.3 to 2.0% by weight and offers few reaction sites with component (a2) and the product does not possess a crosslinked structure obtained from full condensation.

SUMMARY OF INVENTION

Technical Problem

An object of the invention, which has been made under the above-mentioned circumstances, is to provide a release sheet-forming high-release additive which exerts an outstanding tight release effect and which is added in a small amount to a release sheet-forming polyorganosiloxane composition so that the polyorganosiloxane composition may have a desired high release force and experience only a little drop of release force with the lapse of time after curing, a release sheet-forming polyorganosiloxane composition comprising the same, and a release sheet having a cured coating formed therefrom.

Solution to Problem

Making extensive investigations to attain the above object, the inventors have found that a condensation product obtained from dehydration condensation reaction of (A) a polydiorganosiloxane having an average degree of polymerization of 500 to 10,000 and containing at least one hydroxyl group or hydrolyzable group per molecule with (B) a polyorganosiloxane resin primarily comprising $SiO_{4/2}$ units and $R_3SiO_{1/2}$ units, wherein R is each independently a monovalent hydrocarbon group of 1 to 12 carbon atoms free of aliphatic unsaturation or an alkenyl group of 2 to 6 carbon atoms, a molar ratio of $R_3SiO_{1/2}$ units to $SiO_{4/2}$ units is in the range of 0.6 to 1.2, and the total content of hydroxyl and hydrolyzable groups is from 2.1% to less than 10.0% by weight, in the presence of a condensation catalyst exerts an improved high-release additive effect to a release sheet when it is added to a release sheet-forming polyorganosiloxane composition, from which a release sheet is manufactured by coating the polyorganosiloxane composition to a substrate and then curing to form a cured coating thereon; and in particular, that the condensation product exerts an improved tight release effect even when added in small amounts, minimizes a lowering of release force with time after curing, and maintains the release force unchanged. The invention is predicated on these findings.

Accordingly, the invention provides a release sheet-forming high-release additive, a release sheet-forming polyorganosiloxane composition, and a release sheet, as defined below.

[1] A high-release additive for release sheets, comprising a condensation product which is obtained from dehydration condensation reaction of (A) a polydiorganosiloxane having an average degree of polymerization of 500 to 10,000 and containing at least one hydroxyl group or hydrolyzable group per molecule with (B) a polyorganosiloxane resin primarily comprising $SiO_{4/2}$ units and $R_3SiO_{1/2}$ units, wherein R is each independently a monovalent hydrocarbon group of 1 to 12 carbon atoms free of aliphatic unsaturation or an alkenyl group of 2 to 6 carbon atoms, a molar ratio of $R_3SiO_{1/2}$ units to $SiO_{4/2}$ units is in the range of 0.6 to 1.2, and the total content of hydroxyl and hydrolyzable groups is from 2.1% by weight to less than 10.0% by weight.

[2] The high-release additive for release sheets of [1] wherein the polydiorganosiloxane (A) has an average degree of polymerization of 1,050 to 3,000.

[3] The high-release additive for release sheets of [1] or [2] wherein the polydiorganosiloxane (A) and the polyorganosiloxane resin (B) are mixed in a weight ratio of 30:70 to 70:30.

[4] The high-release additive for release sheets of any one of [1] to [3] wherein the dehydration condensation product of components (A) and (B) has a residual hydroxyl group content of up to 0.3% by weight.

[5] The high-release additive for release sheets of any one of [1] to [4] wherein the polydiorganosiloxane (A) contains two hydroxyl groups per molecule.

[6] The high-release additive for release sheets of any one of [1] to [5] wherein the additive is an organic solvent-free non-emulsion composition which is obtained by diluting the condensation product with a polydiorganosiloxane for adjustment to a viscosity of 100 to 100,000 mPa·s.

[7] The high-release additive for release sheets of [6] wherein the polydiorganosiloxane used for dilution contains an aliphatic unsaturated functional group.

[8] The high-release additive for release sheets of [6] or [7] wherein the polydiorganosiloxane used for dilution has a viscosity of 0.1 to 400 mPa·s at 25° C.

[9] A polyorganosiloxane composition for release sheets, comprising:

0.1 to 100 parts by weight of the dehydration condensation product between components (A) and (B) of any one of [1] to [8], (C) 100 parts by weight of a polyorganosiloxane containing at least two alkenyl groups per molecule, (D) 0.1 to 30 parts by weight of a polyorganohydrogensiloxane containing at least three silicon-bonded hydrogen atoms per molecule, and (F) a platinum group metal based catalyst in an amount to give 10 to 1,000 ppm of platinum group metal based on the total weight of the composition.

[10] A release sheet comprising a sheet-like substrate and a cured coating formed on at least one surface of the substrate from the composition of [9].

Advantageous Effects of Invention

When the release sheet-forming high-release additive of the invention is added to a release sheet-forming polyorganosiloxane composition, the additive is effective for increasing the release force of the composition to a very high level as compared with the additive-free composition. The additive imparts an extremely greater release force than prior art high-release additives.

DESCRIPTION OF EMBODIMENTS

Now the invention is described in detail.
Component (A):

Component (A) is a polydiorganosiloxane having an average degree of polymerization of 500 to 10,000 and containing at least one hydroxyl group or hydrolyzable group per molecule, as exemplified by one having the general formula (1).

[Chemical Formula 1]

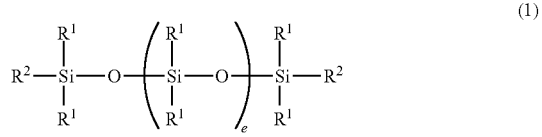

In formula (1), $R^1$ which may be the same or different is a monovalent hydrocarbon group of 1 to 10 carbon atoms free of aliphatic unsaturation, $R^2$ is a hydroxyl group or hydrolyzable group, and e is an integer of 500 to 10,000.

In general formula (1), $R^1$ which may be the same or different is selected from monovalent hydrocarbon groups of 1 to 10 carbon atoms free of aliphatic unsaturation, for example, alkyl groups preferably of 1 to 6 carbon atoms such as methyl, ethyl, propyl and butyl, cycloalkyl groups preferably of 5 to 8 carbon atoms such as cyclohexyl, and aryl groups preferably of 6 to 10 carbon atoms such as phenyl and tolyl, with methyl being most preferred.

$R^2$ is a hydroxyl group or hydrolyzable group. The hydrolyzable groups include alkoxy groups of 1 to 6 carbon atoms, halogen atoms, acyloxy groups, and oxime groups. Component (A) preferably has a structure wherein $R^2$ is hydroxyl, specifically a structure having two hydroxyl groups per molecule, and more specifically a structure having hydroxyl groups at both ends. Of the alkoxy groups, those of 1 to 6 carbon atoms are preferred, examples of which include methoxy, ethoxy, propoxy, and butoxy. Exemplary of the halogen atom are chlorine and bromine.

With respect to the average degree of polymerization (DOP), the polysiloxane of formula (1) should have an average DOP=e of 500 to 10,000, preferably 500 to 3,000, more preferably 1,050 to 3,000, and even more preferably 1,500 to 2,000. An average DOP of less than 500 leads to a low fluidity, but indicates more polyorganosiloxane molecules left unreacted, leading to a lowering of release force. An average DOP of component (A) in excess of 10,000 indicates that the condensation product has too high a viscosity and is difficult to synthesize industrially.

Notably, the average DOP is determined by $^{29}$Si-NMR analysis, computing integrated values of peaks corresponding to —Si($R^1$)$_2$—O units (D units) and $CH_3$—Si($R^1$)$_2$—O— units (M units), and converting the values to $M_2D_x$, wherein x is indicative of a DOP (the same applies hereinafter). $R^1$ is as defined above.

Component (B):

Component (B) is a polyorganosiloxane resin primarily comprising $SiO_{4/2}$ units (Q units) and $R_3SiO_{1/2}$ units (M units), wherein R is each independently a monovalent hydrocarbon group of 1 to 12 carbon atoms free of aliphatic unsaturation or an alkenyl group of 2 to 6 carbon atoms. Herein a molar ratio of $R_3SiO_{1/2}$ units to $SiO_{4/2}$ units is in the range of 0.6 to 1.2, preferably 0.7 to 1.1, and more preferably 0.75 to 1.0. If the ratio of M units to Q units is less than 0.6, the dehydration condensation product has too high a viscosity and is difficult to synthesize. If the ratio exceeds 1.2, the DOP cannot be increased, leading to a lowering of tight release effect.

In the formula, R is each independently a monovalent hydrocarbon group of 1 to 12 carbon atoms free of aliphatic unsaturation or an alkenyl group of 2 to 6 carbon atoms. Examples of the monovalent hydrocarbon group of 1 to 12 carbon atoms, represented by R, include alkyl groups preferably of 1 to 6 carbon atoms such as methyl, ethyl, propyl and butyl, aryl groups preferably of 6 to 10 carbon atoms such as phenyl and tolyl, and aralkyl groups of 7 to 10 carbon atoms such as benzyl. Examples of the alkenyl group of 2 to 6 carbon atoms include vinyl, allyl, and butenyl.

In this embodiment, the polyorganosiloxane resin is obtainable from cohydrolytic condensation of tetraorganoxysilane with triorganomonoorganoxysilane. The resin thus contains $R^3SiO_{3/2}$ units (T units) derived from tetraorganoxysilane and in some cases, further contains $R^3{}_2SiO_{2/2}$ units (D units).

Herein $R^3$ is a hydroxyl group, or a hydrolyzable group such as an alkoxy group of 1 to 6 carbon atoms, acyloxy group, oxime group or halogen atom. Not all $R^3$ groups are hydroxyl. $R^3$ is preferably hydroxyl, methoxy, ethoxy or propoxy.

The total content of hydroxyl and hydrolyzable groups means the total content of hydroxyl groups and hydrolyzable functional groups as mentioned above and is from 2.1% by weight to less than 10.0% by weight, preferably 2.5% to 7.0% by weight, and more preferably 4.0% to 6.0% by weight of the polyorganosiloxane resin. If the content is less than 2.1% by weight, then the tight release effect is insignificant. This is probably because the crosslinking density due to condensation reaction is low although the reason is not well understood. If the content is equal to or more than 10.0% by weight, adhesion to the substrate is substantially worsened.

The polyorganosiloxane resin as component (B) may further comprise $R_2SiO_{2/2}$ units and $RSiO_{3/2}$ units wherein R is as defined above. In this embodiment, the sum of such units is 0 to 30 mol %, preferably 0 to 20 mol %, and more preferably 0 to 10 mol % of the overall polyorganosiloxane resin.

In conducting dehydration condensation reaction of components (A) and (B), first condensation between hydroxyl groups on component (A) and hydrolyzable groups, typically alkoxy groups, on component (B), and condensation between hydroxyl groups and hydrolyzable groups on component (B) occur in the presence of a catalyst. Thereafter, the majority of hydrolyzable groups are gradually converted to hydroxyl groups, followed by condensation between hydroxyl groups.

Condensation reaction between components (A) and (B) is carried out at room temperature or elevated temperature, preferably 60 to 150° C. in the presence of a catalyst, forming a sticky compound. Suitable catalysts include aqueous ammonia, amines such as ethylamine, bases such as potassium hydroxide and sodium hydroxide, titanium compounds such as tetrabutyl titanate, and hexamethyldisilazane. It is noted that the catalyst is preferably used in an amount of 0.1 to 3,000 ppm based on the total weight of components (A) and (B).

Herein components (A) and (B) are preferably mixed in a weight ratio in the range from 30:70 to 70:30, more preferably from 40:60 to 60:40. Outside the range, the tight release effect may decline.

After the dehydration condensation reaction between components (A) and (B), the product contains preferably up to 0.3% by weight, more preferably up to 0.26% by weight of residual hydroxyl groups. If the residual hydroxyl content exceeds 0.3% by weight, adhesion may often be worsened. The adhesion may be improved by adding chlorosilane after the condensation reaction between components (A) and (B) for thereby reducing the number of hydroxyl groups. The amount of chlorosilane added is not particularly limited as long as it is enough to decrease the hydroxyl group content to 0.3% by weight or below. Preferably at least 1.5 moles of chlorosilane is used per mole of hydroxyl groups.

Since the high-release additive has a high viscosity, it is desirably diluted with a low viscosity polyorganosiloxane and eventually used as a dilution having a viscosity of 100 to 100,000 mPa·s, especially 100 to 50,000 mPa·s. The low viscosity polyorganosiloxane used for dilution is preferably an unsaturation-bearing polyorganosiloxane containing an aliphatic unsaturated functional group and having a low viscosity of 0.1 to 400 mPa·s, especially 0.1 to 200 mPa·s. This is not only effective for reducing the viscosity, but also favorable for preventing the leach-out of the high-release additive because the low viscosity unsaturation-bearing polyorganosiloxane reacts with a crosslinker in the presence of a platinum catalyst to form a crosslinked structure of finer network.

It is noted that the viscosity is an absolute viscosity as measured at 25° C. by a Brookfield rotational viscometer (the same applies hereinafter).

Examples of the unsaturated functional group on the low viscosity polyorganosiloxane include alkenyl groups of 2 to 6 carbon atoms such as vinyl, allyl, and hexenyl, with vinyl being preferred.

The amount of the low viscosity polyorganosiloxane used is not limited as long as the viscosity is adjustable to the above-defined range.

Although the high-release additive is preferably an organic solvent free, non-emulsion composition diluted with the above polyorganosiloxane, it may be diluted with a solvent, if necessary, prior to use. Examples of the solvent which can be used herein include toluene, xylene, hexane, heptane, methyl ethyl ketone, methyl isobutyl ketone, acetone, and mineral oils.

If desired, the composition may further comprise optional components such as well-known antioxidants, pigments, stabilizers, antistatic agents, defoamers, adhesion promoters, and inorganic fillers including silica as long as the benefits of the invention are not impaired.

On use of the high-release additive according to the invention, a release sheet-forming polyorganosiloxane composition having added thereto the dehydration condensation product between components (A) and (B) may be applied as such or after dilution with a suitable organic solvent to one or both surfaces of a sheet-like substrate such as paper or film by a coating technique such as roll coating, reverse coating or gravure coating to a coating weight of 0.01 to 100 g/m², and heated at 50 to 200° C. for 1 to 120 seconds, for thereby forming a cured coating on the substrate.

As used herein, release sheets include those based on sheet-like substrates of various well-known films as well as sheet-like substrates of paper.

The release sheet-forming polyorganosiloxane composition used herein is preferably defined as comprising (C) 100 parts by weight of a polyorganosiloxane containing at least two alkenyl groups per molecule, (D) 0.1 to 30 parts by weight of a polyorganohydrogensiloxane containing at least three silicon-bonded hydrogen atoms (SiH groups) per molecule, and (F) a platinum group metal based catalyst in an amount to give 10 to 1,000 ppm of platinum group metal based on the total weight of the composition. Optionally, (E) a reaction inhibitor is blended. The dehydration condensation product of components (A) and (B) may be blended in an amount of preferably 0.1 to 100 parts by weight, more preferably 0.1 to 30 parts by weight per 100 parts by weight of component (C) and mixed uniformly prior to use.

Component (C) is a linear polyorganosiloxane having alkenyl groups at ends and/or side chains, as represented by the general formula (2).

[Chemical Formula 2]

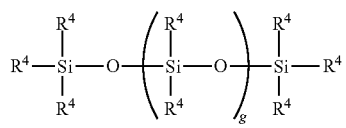

(2)

In formula (2), $R^4$ which may be the same or different is selected from substituted or unsubstituted monovalent hydrocarbon groups of 1 to 10 carbon atoms free of aliphatic unsaturation and alkenyl groups of $-(CH_2)_f-CH=CH_2$ wherein f is 0 or an integer of 1 to 6, at least two $R^4$ groups are alkenyl groups, and g is such a number that the alkenyl-containing polyorganosiloxane may have a viscosity of 50 to 400 mPa·s.

The monovalent hydrocarbon group of 1 to 10 carbon atoms is a substituted or unsubstituted monovalent hydrocarbon group of 1 to 10 carbon atoms selected from alkyl groups preferably of 1 to 6 carbon atoms such as methyl, ethyl, propyl and butyl, cycloalkyl groups preferably of 5 to 8 carbon atoms such as cyclohexyl, aryl groups preferably of 6 to 10 carbon atoms such as phenyl and tolyl, aralkyl groups preferably of 7 to 10 carbon atoms such as benzyl, and substituted forms of the foregoing in which one or more or all carbon-bonded hydrogen atoms are substituted by hydroxy or cyano groups or halogen atoms, such as hydroxypropyl, cyanoethyl, 1-chloropropyl and 3,3,3-trifluoropropyl. Inter alia, alkyl and aryl groups are preferred from the release aspect.

Component (D) is a polyorganohydrogensiloxane containing at least three silicon-bonded hydrogen atoms (SiH groups) per molecule, preferably 5 to 100 SiH groups. A cured coating forms via addition reaction of the SiH groups with alkenyl groups on polyorganosiloxane (C). The structure of component (D) may be represented by the average compositional formula (3).

$$R_n^5 H_m SiO_{(4-n-m)/2} \quad (3)$$

In formula (3), $R^5$ is a substituted or unsubstituted monovalent hydrocarbon group preferably of 1 to 10 carbon atoms free of aliphatic unsaturation. Examples include alkyl groups such as methyl, ethyl and propyl, aryl groups such as phenyl, and halogenated alkyl groups such as 3,3,3-trifluoropropyl. The letters n and m are preferably positive numbers meeting the range: $0.5 \le n \le 1.5$, $0.5 \le m \le 1.5$, and $1.0 \le n+m \le 3.0$, especially $0.8 \le n \le 1.2$, $0.8 \le m \le 1.2$, and $1.6 \le n+m \le 2.4$.

The polyorganohydrogensiloxane as component (D) is blended in an amount of 0.1 to 30 parts by weight, preferably 0.1 to 20 parts by weight per 100 parts by weight of component (C).

Specifically, the polyorganohydrogensiloxane as component (D) is preferably blended in such an amount that 1.5 to 2.5 moles, more preferably 1.6 to 2.2 moles of silicon-bonded hydrogen atoms on the polyorganohydrogensiloxane as component (D) may be available per mole of alkenyl groups on the alkenyl-containing linear polyorganosiloxane as component (C), i.e., a molar ratio of SiH/alkenyl may range from 1.5 to 2.5, more preferably from 1.6 to 2.2. If the molar ratio is less than 1.5, curability may be insufficient. If the molar ratio exceeds 2.5, the release force may undergo substantial changes with time.

Component (E) is a reaction inhibitor which is optional and serves to control the catalytic activity of the platinum group metal based catalyst. It is selected from various organic nitrogen compounds, organic phosphorus compounds, acetylenic compounds, oxime compounds, and organic chromium compounds. Examples include acetylenic alcohols such as 3-methyl-1-butyn-3-ol, 3,5-dimethyl-1-hexyn-3-ol, 3-methyl-1-pentyn-3-ol and phenylbutynol, acetylenic compounds such as 3-methyl-3-1-pentyn-1-yne and 3,5-dimethyl-1-hexyn-3-yne, the reaction products of these acetylenic compounds with alkoxysilane, alkoxysiloxane, hydrogensilane or hydrogensiloxane, vinylsiloxanes such as cyclic tetramethylvinylsiloxanes, organic nitrogen compounds such as benzotriazole, organic phosphorus compounds, oxime compounds, and organic chromium compounds. When used, the reaction inhibitor (E) is blended in such an amount that the treating bath may be stable. The amount is generally 0 to 3% by weight, especially 0.01 to 3% by weight based on the total weight of the composition, or preferably 0.01 to 3 parts by weight per 100 parts by weight of component (C).

Component (F) is a platinum group metal based catalyst which may be selected from well-known addition reaction catalysts. Examples of the platinum group metal based catalyst include platinum, palladium, rhodium, and ruthenium based catalysts. Inter alia, platinum based catalysts are preferably used. Examples of the platinum based catalysts include chloroplatinic acid, an alcohol solution or aldehyde solution of chloroplatinic acid, and complexes of chloroplatinic acid with various olefins or vinylsiloxanes.

Although the platinum group metal based catalyst (E) may be added in a catalytic amount, it is preferred from the economical aspect to add the catalyst in an amount to give 10 to 1,000 ppm, more preferably 50 to 200 ppm of platinum group metal based on the total weight of the composition.

On use of the high-release additive according to the invention, a coating solution is prepared by adding the additive to a commercially available, release sheet-forming, curable silicone composition, and mixing them, or the aforementioned polyorganosiloxane composition is prepared, and applied onto substrates such as paper or plastic film. As the coating technique, any desired one selected, for example, from roll coating, gravure coating, air knife coating, wire coating, doctor coating and brush coating may be employed.

In this case, the composition is coated onto a flexible thin-film material such as paper or film to a coating weight of 0.1 to 5 g/m² as solids, and treated at 80 to 200° C. for 5 seconds to 3 minutes on a heating roll, heating drum or circulating hot air dryer, for thereby forming a cured coating having desired release property.

EXAMPLES

The invention is now described by referring to Synthesis Examples, Examples and Comparative Examples, although the invention is not limited thereto. It is noted that the viscosity shown below is an absolute viscosity as measured at 25° C. by a Brookfield rotational viscometer. Me stands for methyl.
Synthesis of High-Release Additive in Table 1

Synthesis Example 1

A solution was prepared by blending 50 parts by weight of both end hydroxydimethylsiloxy-capped linear dimethylpolysiloxane of formula (4) having an average DOP of 1,590 as ingredient (A), 50 parts by weight as nonvolatile (125 parts by weight if inclusive of volatile) of a solution of polyorganosiloxane in 60 wt % toluene, i.e., toluene solution of a MQ resin, the MQ resin consisting of $Me_3SiO_{0.5}$ units (M units), $SiO_2$ units (Q units), $(CH_3O)SiO_{3/2}$ units, and $(HO)SiO_{3/2}$ units, wherein M/Q molar ratio=0.8, total content of hydroxyl and alkoxy 4.75 wt % (hydroxyl content 1.33 wt %=0.078 mol/100 g, alkoxy content 3.42 wt %=0.110 mol/100 g) as ingredient (B), 10 parts by weight of toluene, and 0.4 part by weight of 28 wt % aqueous ammonia. The solution was stirred at room temperature for 16 hours. Thereafter, in the system equipped with a Dean-Stark trap, toluene was refluxed at an internal temperature of 110-120° C. for removing ammonia and water.

A nonvolatile content of the reaction product was measured. To the product with a nonvolatile content of 70 wt %, both end vinyldimethylsiloxy-capped linear dimethylpolysiloxane having an average DOP of 80 and a viscosity of 100 mPa·s was added so as to adjust the nonvolatile content to 30 wt %. Under vacuum and nitrogen bubbling conditions, the mixture was heated at 150° C. to remove toluene, yielding a high-release additive.

[Chemical Formula 3]

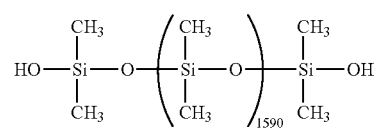

(4)

Synthesis Example 2

An additive was prepared by the same procedure as in Synthesis Example 1 using the same ingredients and amounts except that the both end hydroxydimethylsiloxy-capped linear dimethylpolysiloxane was replaced by a dimethylpolysiloxane of formula (5) having an average DOP of 1,050.

[Chemical Formula 4]

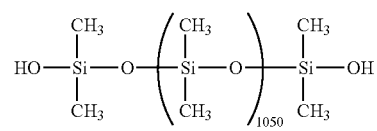

(5)

Synthesis Example 3

An additive was prepared by the same procedure as in Synthesis Example 1 using the same ingredients and amounts except that the both end hydroxydimethylsiloxy-capped linear dimethylpolysiloxane was replaced by a dimethylpolysiloxane of formula (6) having an average DOP of 610.

[Chemical Formula 5]

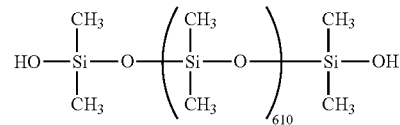

(6)

Synthesis Example 4

An additive was prepared by the same procedure as in Synthesis Example 1 using the same ingredients and amounts except that the both end hydroxydimethylsiloxy-capped linear dimethylpolysiloxane was replaced by a dimethylpolysiloxane of formula (7) having an average DOP of 470.

[Chemical Formula 6]

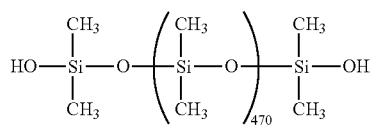

(7)

Synthesis Example 5

An additive was prepared by the same procedure as in Synthesis Example 1 using the same ingredients and amounts except that the both end hydroxydimethylsiloxy-capped linear dimethylpolysiloxane was replaced by a dimethylpolysiloxane of formula (8) having an average DOP of 390.

[Chemical Formula 7]

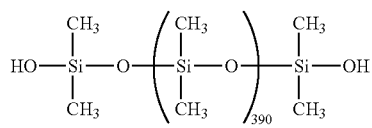

(8)

Synthesis Example 6

A composition of Synthesis Example 6 is obtained by merely mixing the ingredients of Synthesis Example 1 without dehydration condensation reaction, adding both end vinyldimethylsiloxy-capped linear dimethylpolysiloxane thereto, and then removing the solvent.

A solution was prepared by blending 50 parts by weight of both end hydroxydimethylsiloxy-capped linear dimethylpolysiloxane of formula (4), 50 parts by weight as nonvolatile (125 parts by weight if inclusive of volatile) of a solution of polysiloxane in 60 wt % toluene, i.e., toluene solution of a MQ resin, the MQ resin consisting of $Me_3SiO_{0.5}$ units (M units), $SiO_2$ units (Q units), $(CH_3O)SiO_{3/2}$ units, and (HO)$SiO_{3/2}$ units, wherein M/Q molar ratio=0.8, total content of hydroxyl and alkoxy 4.75 wt % (hydroxyl content 1.33 wt %=0.078 mol/100 g, alkoxy content 3.42 wt %=0.110 mol/100 g), and 10 parts by weight of toluene. The solution was thoroughly stirred. Thereafter, to the solution with a nonvolatile content of 70 wt %, both end vinyldimethylsiloxy-capped linear dimethylpolysiloxane having an average DOP of 80 and a viscosity of 100 mPa·s was added so as to adjust the nonvolatile content to 30 wt %. Under vacuum and nitrogen bubbling conditions, the mixture was heated at 150° C. to remove toluene, yielding an additive.

Synthesis Example 7

A solution was prepared by blending 50 parts by weight of both end hydroxydimethylsiloxy-capped linear dimethylpolysiloxane of formula (4), 50 parts by weight as nonvolatile (125 parts by weight if inclusive of volatile) of a solution of polysiloxane in 60 wt % toluene, i.e., toluene solution of a MQ resin, the MQ resin consisting of $Me_3SiO_{0.5}$ units (M units), $SiO_2$ units (Q units), $(CH_3O)SiO_{3/2}$ units, and (HO)$SiO_{3/2}$ units, wherein M/Q molar ratio=0.8, total content of hydroxyl and alkoxy 1.89 wt % (hydroxyl content 0.34 wt %=0.02 mol/100 g, alkoxy content 1.55 wt %=0.05 mol/100 g), 10 parts by weight of toluene, and 0.4 part by weight of 28 wt % aqueous ammonia. The solution was stirred at room temperature for 16 hours. Thereafter, in the system equipped with a Dean-Stark trap, toluene was refluxed at an internal temperature of 110-120° C. for removing ammonia and water. A nonvolatile content of the reaction product was measured. To the product with a nonvolatile content of 70 wt %, both end vinyldimethylsiloxy-capped linear dimethylpolysiloxane having an average DOP of 80 and a viscosity of 100 mPa·s was added so as to adjust the nonvolatile content to 30 wt %. Under vacuum and nitrogen bubbling conditions, the mixture was heated at 150° C. to remove toluene, yielding an additive.

Synthesis of High-Release Additive in Table 2

Synthesis Example 8

A solution was prepared by blending 30 parts by weight of both end hydroxydimethylsiloxy-capped linear dimethylpolysiloxane of formula (4) as ingredient (A), 70 parts by weight as nonvolatile (175 parts by weight if inclusive of volatile) of a solution of polysiloxane in 60 wt % toluene, i.e., toluene solution of a MQ resin, the MQ resin consisting of $Me_3SiO_{0.5}$ units (M units), $SiO_2$ units (Q units), $(CH_3O)SiO_{3/2}$ units, and (HO)$SiO_{3/2}$ units, wherein M/Q molar ratio=0.8, total content of hydroxyl and alkoxy 4.28 wt % (hydroxyl content 1.15 wt %=0.068 mol/100 g, alkoxy content 3.13 wt %=0.101 mol/100 g) as ingredient (B), 10 parts by weight of toluene, and 0.4 part by weight of 28 wt % aqueous ammonia. The solution was stirred at room temperature for 16 hours. Thereafter, in the system equipped with a Dean-Stark trap, toluene was refluxed at an internal temperature of 110-120° C. for removing ammonia and water. A nonvolatile content of the reaction product was measured. To the product with a nonvolatile content of 70 wt %, both end vinyldimethylsiloxy-capped linear dimethylpolysiloxane having an average DOP of 80 and a viscosity of 100 mPa·s was added so as to adjust the nonvolatile content to 30 wt %. Under vacuum and nitrogen bubbling conditions, the mixture was heated at 150° C. to remove toluene, yielding a high-release additive.

Synthesis Example 9

An additive was prepared by the same procedure as in Synthesis Example 8 using the same ingredients except that 40 parts by weight of the linear dimethylpolysiloxane of formula (4) and 60 parts by weight as the nonvolatile of the MQ resin toluene solution were blended.

Synthesis Example 10

An additive was prepared by the same procedure as in Synthesis Example 8 using the same ingredients except that 60 parts by weight of the linear dimethylpolysiloxane of formula (4) and 40 parts by weight as the nonvolatile of the MQ resin toluene solution were blended.

Synthesis Example 11

An additive was prepared by the same procedure as in Synthesis Example 8 using the same ingredients except that 70 parts by weight of the linear dimethylpolysiloxane of formula (4) and 30 parts by weight as the nonvolatile of the MQ resin toluene solution were blended.

Examples and Comparative Examples

A series of polyorganosiloxane compositions in which the high-release additives obtained in Synthesis Examples were blended in the basic formulation described below were prepared and cured by the methods described below.

These polyorganosiloxane compositions were evaluated for initial release force, aged release force, and hydrolyzable group content by the methods described below. The viscosity of the final composition was measured by the above-mentioned method. All polyorganosiloxane compositions cured without raising any problems.

<Method of Preparing Polyorganosiloxane Composition>

[Chemical Formula 8]

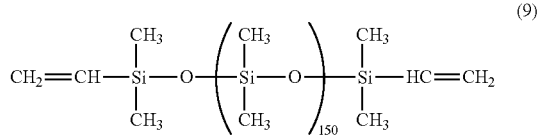

(9)

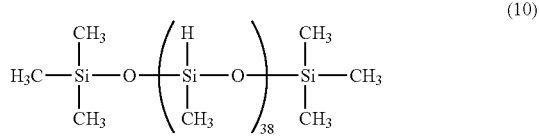

(10)

A series of polyorganosiloxane compositions were prepared by starting with a basic formulation consisting of 100 parts by weight of both end vinyldimethylsiloxy-capped polydiorganosiloxane having formula (9), 2.7 parts by weight of polymethylhydrogensiloxane having formula (10), 0.4 part by weight of ethynylcyclohexanol, and 2 parts by weight (100 ppm of platinum) of a chloroplatinic acid-vinylsiloxane complex salt, blending 20 parts by weight of the high-release additive compositions obtained in Synthesis Examples in the basic formulation, and thoroughly mixing them.

<Method of Curing Polyorganosiloxane Composition>

The polyorganosiloxane composition thus prepared was coated onto a polyethylene-laminated paper substrate to a coating weight of 0.9 to 1.1 g/m$^2$ and heated in a hot air dryer at 140° C. for 30 seconds. The coated substrate was used as a separator in the measurements described below.

<Measurement of Initial Release Force>

A silicone separator obtained by the above curing method was stored at 25° C. for 20 hours, and overlaid with TESA-7475 tape. The assembly was stored under a load of 20 g/m$^2$ in a dryer at 70° C. for 20 hours, obtaining a test sample. Using a tensile tester, a force required for peeling was measured by pulling the TESA-7475 tape back from the test sample at an angle of 180° and 0.3 m/min, this being reported as an initial release force (N/25 mm).

<Measurement of Aged Release Force>

A silicone separator obtained by the above curing method was stored at 50° C. for 7 days, and overlaid with TESA-7475 tape. The assembly was stored under a load of 20 g/m$^2$ in a dryer at 70° C. for 20 hours, obtaining a test sample. Using a tensile tester, a force required for peeling was measured by pulling the TESA-7475 tape back from the test sample at an angle of 180° and 0.3 m/min, this being reported as an aged release force (N/25 mm).

<Method of Measuring Total Content of Hydrolyzable and Hydroxyl Groups>

A molar fraction of Si and a molar fraction of hydrolyzable group are determined by $^{29}$Si-NMR, which is converted on a weight scale to a hydrolyzable group content (wt %). A molar fraction of Si and a molar fraction of alkoxy group are determined by $^1$H-NMR. A molar fraction of hydroxyl group is determined by subtracting the molar fraction of alkoxy group determined by $^1$H-NMR from the molar fraction of hydrolyzable group determined by $^{29}$Si-NMR, before it is converted to a wt % content.

TABLE 1

Relationship of release force to varying DOP of both end hydroxyl-capped polydimethylsiloxane as ingredient (A) of high-release additive (Examples 1-3, Comparative Examples 1-3), to condensation reaction or no-reaction between ingredients (A) and (B) (Example 1, Comparative Example 4), and relationship of release force to varying total content of hydroxyl group and alkoxy group (hydrolyzable group) in MQ resin as ingredient (B) (Example 1, Comparative Example 5)

|  | High-release additive (average DOP of both end hydroxyl-capped poly-dimethylsiloxane (A)) | Total content of hydroxyl group and hydrolyzable group in MQ resin (B), wt % | Residual hydroxyl content of dehydration condensation product, wt % | Initial release force, N/25 mm | Aged release force, N/25 mm | Final composition viscosity, mPa · s |
|---|---|---|---|---|---|---|
| Example 1 | Composition of Synthesis Example 1 (1,590) | 4.75 | 0.22 | 73 | 62 | 630 |
| Example 2 | Composition of Synthesis Example 2 (1,050) | 4.75 | 0.22 | 68 | 56 | 620 |
| Example 3 | Composition of Synthesis Example 3 (610) | 4.75 | 0.24 | 58 | 49 | 600 |
| Comparative Example 1 | Composition of Synthesis Example 4 (470) | 4.75 | 0.24 | 46 | 41 | 570 |
| Comparative Example 2 | Composition of Synthesis Example 5 (390) | 4.75 | 0.26 | 45 | 37 | 560 |
| Comparative Example 3 | High-release additive omitted | — | — | 13 | 8 | 420 |
| Comparative Example 4 | Composition of Synthesis Example 6, that is, a mere blend of ingredients of | 4.75 | 4.80 | 13 | 7 | 440 |

TABLE 1-continued

Relationship of release force to varying DOP of both end hydroxyl-capped polydimethylsiloxane as ingredient (A) of high-release additive (Examples 1-3, Comparative Examples 1-3), to condensation reaction or no-reaction between ingredients (A) and (B) (Example 1, Comparative Example 4), and relationship of release force to varying total content of hydroxyl group and alkoxy group (hydrolyzable group) in MQ resin as ingredient (B) (Example 1, Comparative Example 5)

|  | High-release additive (average DOP of both end hydroxyl-capped poly-dimethylsiloxane (A)) | Total content of hydroxyl group and hydrolyzable group in MQ resin (B), wt % | Residual hydroxyl content of dehydration condensation product, wt % | Initial release force, N/25 mm | Aged release force, N/25 mm | Final composition viscosity, mPa·s |
|---|---|---|---|---|---|---|
| Comparative Example 5 | Synthesis Example 1 without dehydration condensation reaction Composition of Synthesis Example 7 (1,590) | 1.89 | 0.12 | 45 | 38 | 520 |

TABLE 2

Relationship of release force to blending ratio of both end hydroxyl-capped polydimethylsiloxane as ingredient (A) to MQ resin as ingredient (B) of high-release additive

|  | High-release additive (weight ratio of ingredient (A):ingredient (B)) | Total content of hydroxyl group and hydrolyzable group in MQ resin (B), wt % | Residual hydroxyl content of dehydration condensation product, wt % | Initial release force, N/25 mm | Aged release force, N/25 mm | Final composition viscosity, mPa·s |
|---|---|---|---|---|---|---|
| Example 4 | Composition of Synthesis Example 8 (30:70) | 4.28 | 0.24 | 63 | 56 | 480 |
| Example 5 | Composition of Synthesis Example 9 (40:60) | 4.28 | 0.20 | 69 | 58 | 530 |
| Example 6 | Composition of Synthesis Example 1 (50:50) | 4.75 | 0.22 | 73 | 62 | 630 |
| Example 7 | Composition of Synthesis Example 10 (60:40) | 4.28 | 0.22 | 68 | 58 | 600 |
| Example 8 | Composition of Synthesis Example 11 (70:30) | 4.28 | 0.25 | 60 | 50 | 550 |

The invention claimed is:

1. A high-release additive for release sheets, comprising a condensation product which is obtained from dehydration condensation reaction of
   (A) a polydiorganosiloxane having an average degree of polymerization of 1,050 to 3,000 and containing at least one hydroxyl group or hydrolyzable group per molecule with
   (B) a polyorganosiloxane resin primarily comprising $SiO_{4/2}$ units and $R_3SiO_{1/2}$ units, wherein R is each independently a monovalent hydrocarbon group of 1 to 12 carbon atoms free of aliphatic unsaturation or an alkenyl group of 2 to 6 carbon atoms, a molar ratio of $R_3SiO_{1/2}$ units to $SiO_{4/2}$ units is in the range of 0.6 to 1.2, and the total content of hydroxyl and hydrolyzable groups is from 4.0% by weight to less than 10.0% by weight,
   wherein the dehydration condensation product of components (A) and (B) has a residual hydroxyl group content of up to 0.3% by weight.

2. The high-release additive for release sheets of claim 1 wherein the polydiorganosiloxane (A) and the polyorganosiloxane resin (B) are mixed in a weight ratio of 30:70 to 70:30.

3. The high-release additive for release sheets of claim 1 wherein the polydiorganosiloxane (A) contains two hydroxyl groups per molecule.

4. The high-release additive for release sheets of claim 1 wherein the additive is an organic solvent-free non-emulsion composition which is obtained by diluting the condensation product with a polydiorganosiloxane for adjustment to a viscosity of 100 to 100,000 mPa·s.

5. The high-release additive for release sheets of claim 4 wherein the polydiorganosiloxane used for dilution contains an aliphatic unsaturated functional group.

6. The high-release additive for release sheets of claim 4 wherein the polydiorganosiloxane used for dilution has a viscosity of 0.1 to 400 mPa·s at 25° C.

7. A polyorganosiloxane composition for release sheets, comprising:
   0.1 to 100 parts by weight of the dehydration condensation product between components (A) and (B) of claim 1, (C) 100 parts by weight of a polyorganosiloxane containing at least two alkenyl groups per molecule, (D) 0.1 to 30 parts by weight of a polyorganohydrogensiloxane containing at least three silicon-bonded hydrogen atoms per molecule, and (F) a platinum group metal based catalyst in an amount to give 10 to 1,000 ppm of platinum group metal based on the total weight of the composition, wherein the cured product of the polyorganosiloxane composition imparts an initial release force of 58 to 73 N/25 mm.

8. A release sheet comprising a sheet-like substrate and a cured coating formed on at least one surface of the substrate from the composition of claim 7.

9. The high-release additive for release sheets of claim 2 wherein the polydiorganosiloxane (A) contains two hydroxyl groups per molecule.

10. The high-release additive for release sheets of claim 2 wherein the additive is an organic solvent-free non-emulsion composition which is obtained by diluting the condensation product with a polydiorganosiloxane for adjustment to a viscosity of 100 to 100,000 mPa·s.

11. The high-release additive for release sheets of claim 3 wherein the additive is an organic solvent-free non-emulsion composition which is obtained by diluting the condensation product with a polydiorganosiloxane for adjustment to a viscosity of 100 to 100,000 mPa·s.

12. The high-release additive for release sheets of claim 1 wherein the polydiorganosiloxane of component (A) has an average degree of polymerization of 1,050 to 2,000.

* * * * *